(12) United States Patent
Headley

(10) Patent No.: US 8,468,358 B2
(45) Date of Patent: Jun. 18, 2013

(54) METHODS FOR IDENTIFYING THE GUARANTOR OF AN APPLICATION

(75) Inventor: Paul Headley, Hollister, CA (US)

(73) Assignee: Veritrix, Inc., Palo Alto, CA (US)

( * ) Notice: Subject to any disclaimer, the term of this patent is extended or adjusted under 35 U.S.C. 154(b) by 160 days.

(21) Appl. No.: 12/942,248

(22) Filed: Nov. 9, 2010

(65) Prior Publication Data

US 2012/0117386 A1    May 10, 2012

(51) Int. Cl.
*G06F 7/04* (2006.01)

(52) U.S. Cl.
USPC ............... 713/176; 713/161; 713/168; 726/4

(58) Field of Classification Search
USPC ............... 713/155–156, 161, 168, 176; 726/4
See application file for complete search history.

(56) References Cited

U.S. PATENT DOCUMENTS

| | | | |
|---|---|---|---|
| 5,033,088 A | 7/1991 | Shipman | |
| 5,805,674 A | 9/1998 | Anderson, Jr. | |
| 5,841,870 A * | 11/1998 | Fieres et al. | 713/156 |
| 5,958,016 A | 9/1999 | Chang et al. | |
| 6,009,442 A | 12/1999 | Chen et al. | |
| 6,021,491 A | 2/2000 | Renaud | |
| 6,256,630 B1 | 7/2001 | Gilai et al. | |
| 6,262,732 B1 | 7/2001 | Coleman et al. | |
| 6,446,210 B1 | 9/2002 | Borza | |
| 6,480,304 B1 | 11/2002 | Os et al. | |
| 6,480,825 B1 | 11/2002 | Sharma et al. | |
| 6,496,206 B1 | 12/2002 | Mernyk et al. | |
| 6,496,595 B1 | 12/2002 | Puchek et al. | |
| 6,501,966 B1 | 12/2002 | Bareis et al. | |
| 6,519,561 B1 | 2/2003 | Farrell et al. | |
| 6,529,885 B1 | 3/2003 | Johnson | |
| 6,581,042 B2 | 6/2003 | Pare, Jr. et al. | |
| 6,671,672 B1 | 12/2003 | Heck | |
| 6,697,947 B1 | 2/2004 | Matyas, Jr. et al. | |
| 6,766,295 B1 | 7/2004 | Murveit et al. | |
| 6,778,644 B1 | 8/2004 | Jenkins et al. | |
| 6,819,219 B1 | 11/2004 | Bolle et al. | |

(Continued)

FOREIGN PATENT DOCUMENTS

| | | |
|---|---|---|
| CA | 2278549 A1 | 7/1998 |
| CA | 2399961 A1 | 4/1999 |

(Continued)

OTHER PUBLICATIONS

U.S. Appl. No. 13/413,578, Paul Headley, Systems and Methods for Controlling Access to Encrypted Data Stored on a Mobile Device, filed Mar. 6, 2012.

(Continued)

*Primary Examiner* — Aravind Moorthy
(74) *Attorney, Agent, or Firm* — Peters Verny, LLP

(57) ABSTRACT

Third-party applications for platforms are linked to identified individuals that guarantee the security of the applications. The linkage is achieved by acquiring one or more biometric records of the individual guarantor, storing those records as a signature in a database, assigning a unique identifier to the signature, and embedding that unique identifier in the executable file of the application. The signature of the guarantor can be compared to other stored signatures of other guarantors to check for individuals posing under multiple aliases. The signature of a guarantor linked to a malicious application can be flagged so that a subsequent application guaranteed by the same individual can be disapproved.

4 Claims, 3 Drawing Sheets

U.S. PATENT DOCUMENTS

| | | |
|---|---|---|
| 6,886,095 B1 | 4/2005 | Hind et al. |
| 6,907,408 B2 | 6/2005 | Angel |
| 6,934,858 B2 | 8/2005 | Woodhill |
| 6,944,772 B2 | 9/2005 | Dozortsev |
| 6,993,166 B2 | 1/2006 | Lo et al. |
| 7,171,694 B1 | 1/2007 | Jespersen et al. |
| 7,240,363 B1 | 7/2007 | Ellingson |
| 7,277,891 B2 | 10/2007 | Howard et al. |
| 7,305,700 B2 | 12/2007 | Boynton et al. |
| 7,319,987 B1 | 1/2008 | Hoffman et al. |
| 7,333,635 B2 | 2/2008 | Tsantes et al. |
| 7,334,259 B2 | 2/2008 | Haala |
| 7,349,557 B2 | 3/2008 | Tibor |
| 7,352,868 B2 | 4/2008 | Hawkes et al. |
| 7,383,572 B2 | 6/2008 | Rolfe |
| 7,461,258 B2 | 12/2008 | Rolfe |
| 7,522,751 B2 | 4/2009 | White et al. |
| 7,545,961 B2 | 6/2009 | Ahern et al. |
| 7,545,962 B2 | 6/2009 | Peirce et al. |
| 7,617,522 B2 | 11/2009 | Schmidt et al. |
| 7,634,662 B2 * | 12/2009 | Monroe .................. 713/186 |
| 7,647,498 B2 | 1/2010 | Brown et al. |
| 7,676,439 B2 | 3/2010 | Tattan et al. |
| 7,685,629 B1 | 3/2010 | White et al. |
| 7,689,833 B2 | 3/2010 | Lange |
| 7,690,032 B1 | 3/2010 | Peirce |
| 7,698,322 B1 | 4/2010 | Langley |
| 7,702,918 B2 | 4/2010 | Tattan et al. |
| 7,788,730 B2 * | 8/2010 | Dean et al. .................. 726/30 |
| 7,797,545 B2 * | 9/2010 | Adams et al. ............... 713/179 |
| 7,835,548 B1 | 11/2010 | Langley |
| 7,865,449 B2 | 1/2011 | Tattan et al. |
| 7,865,937 B1 | 1/2011 | White et al. |
| 7,941,380 B2 | 5/2011 | Tattan et al. |
| 7,987,495 B2 | 7/2011 | Maler et al. |
| 7,997,972 B2 | 8/2011 | Nguyen et al. |
| 8,006,291 B2 | 8/2011 | Headley et al. |
| 8,166,297 B2 | 4/2012 | Headley |
| 8,185,646 B2 | 5/2012 | Headley |
| 8,347,370 B2 | 1/2013 | Headley |
| 2002/0129251 A1 * | 9/2002 | Itakura et al. ............... 713/176 |
| 2002/0129255 A1 * | 9/2002 | Tsuchiyama et al. ....... 713/176 |
| 2002/0152179 A1 | 10/2002 | Racov |
| 2002/0174347 A1 | 11/2002 | Ting |
| 2003/0005326 A1 | 1/2003 | Flemming |
| 2003/0140235 A1 | 7/2003 | Immega et al. |
| 2003/0149881 A1 * | 8/2003 | Patel et al. ................. 713/186 |
| 2003/0163739 A1 | 8/2003 | Armington et al. |
| 2003/0236978 A1 | 12/2003 | Evans et al. |
| 2004/0158723 A1 | 8/2004 | Root |
| 2005/0091338 A1 | 4/2005 | de la Huerga |
| 2005/0114705 A1 | 5/2005 | Reshef et al. |
| 2006/0021009 A1 | 1/2006 | Lunt |
| 2006/0041755 A1 | 2/2006 | Pemmaraju |
| 2006/0106734 A1 | 5/2006 | Hoffman et al. |
| 2006/0129821 A1 * | 6/2006 | Zugenmaier et al. ....... 713/175 |
| 2006/0136219 A1 | 6/2006 | Wang |
| 2006/0136744 A1 | 6/2006 | Lange |
| 2006/0184800 A1 | 8/2006 | Rosenberg |
| 2006/0212717 A1 | 9/2006 | Ito et al. |
| 2006/0245619 A1 | 11/2006 | Sathath |
| 2007/0055517 A1 | 3/2007 | Spector |
| 2007/0061590 A1 | 3/2007 | Boye et al. |
| 2007/0107016 A1 | 5/2007 | Angel et al. |
| 2007/0107017 A1 | 5/2007 | Angel et al. |
| 2007/0107021 A1 | 5/2007 | Angel et al. |
| 2007/0127772 A1 * | 6/2007 | Schuessler .................. 382/100 |
| 2007/0169182 A1 | 7/2007 | Wolfond et al. |
| 2007/0175986 A1 | 8/2007 | Petrone et al. |
| 2007/0186106 A1 | 8/2007 | Ting et al. |
| 2007/0198435 A1 | 8/2007 | Siegal et al. |
| 2007/0226516 A1 | 9/2007 | Kubota et al. |
| 2007/0226787 A1 | 9/2007 | Maletsky et al. |
| 2008/0052527 A1 | 2/2008 | Siedlarz |
| 2008/0077524 A1 | 3/2008 | Greene |
| 2008/0077525 A1 | 3/2008 | Willey et al. |
| 2008/0077526 A1 | 3/2008 | Arumugam |
| 2008/0086319 A1 | 4/2008 | Berger |
| 2008/0086764 A1 | 4/2008 | Kulkarni et al. |
| 2008/0091618 A1 | 4/2008 | Obrea et al. |
| 2008/0113786 A1 | 5/2008 | Alderucci et al. |
| 2008/0141353 A1 | 6/2008 | Brown |
| 2009/0052745 A2 | 2/2009 | Sathath |
| 2009/0116703 A1 | 5/2009 | Schultz |
| 2009/0119299 A1 | 5/2009 | Rhodes |
| 2009/0164796 A1 | 6/2009 | Peirce |
| 2009/0254572 A1 * | 10/2009 | Redlich et al. .................. 707/10 |
| 2009/0259588 A1 | 10/2009 | Lindsay |
| 2009/0313165 A1 | 12/2009 | Walter |
| 2009/0327729 A1 * | 12/2009 | Rhodes et al. ............... 713/171 |
| 2010/0029196 A1 | 2/2010 | Tan |
| 2010/0039218 A1 | 2/2010 | Cohen et al. |
| 2010/0107230 A1 | 4/2010 | Tyagi et al. |
| 2010/0146604 A1 | 6/2010 | Piccionelli |
| 2010/0312763 A1 | 12/2010 | Peirce |
| 2011/0035788 A1 | 2/2011 | White et al. |
| 2011/0209200 A2 | 8/2011 | White et al. |
| 2011/0231911 A1 | 9/2011 | White et al. |

FOREIGN PATENT DOCUMENTS

| | | |
|---|---|---|
| WO | 0156352 A2 | 8/2001 |
| WO | 2009032036 A2 | 3/2009 |
| WO | 2010096628 A2 | 8/2010 |

OTHER PUBLICATIONS

U.S. Appl. No. 12/137,129, Paul Headley, Single-Channel Multi-Factor Authentication, filed Jun. 11, 2008.

U.S. Appl. No. 13/211,230, Paul Headley, Methods for the Secure Use of One-Time Passwords, filed Aug. 16, 2011.

U.S. Appl. No. 13/213,029, Paul Headley, Multi-Channel Multi-Factor Authentication, filed Aug. 18, 2011.

U.S. Appl. No. 13/213,035, Paul Headley, Multi-Channel Multi-Factor Authentication, filed Aug. 18, 2011.

U.S. Appl. No. 13/442,232, Paul Headley, User Authentication for Social Networks, filed Apr. 9, 2012.

U.S. Appl. No. 13/469,568, Paul Headley, Methods for Thwarting Man-In-The-Middle Authentication Hacking, filed Jun. 15, 2012.

International Search Report and Written Opinion, PCT/US09/43363 (May 8, 2009), dated Jul. 16, 2009.

International Search Report and Written Opinion, PCT/US09/47049 (Jun. 11, 2009), dated Sep. 1, 2009.

International Search Report and Written Opinion, PCT/US09/48842 (Jun. 26, 2009), dated Aug. 3, 2009.

International Search Report and Written Opinion, PCT/US09/62490 (Oct. 29, 2009), dated Dec. 14, 2009.

International Search Report and Written Opinion, PCT/US11/58974 (Nov. 2, 2011), dated Mar. 16, 2012.

Vince Thomas et al., "Learning to Predict Gender from Iris Images," First IEEE International Conference on Biometrics: Theory, Applications, and Systems, Sep. 2007.

Jain et al., Soft Biometric Traits for Personal Recognition Systems, http://www.springerlink.com/content/5gg1c23821cevbnk/, Jul. 2004.

Ambalakat, Security of Biometric Authentication Systems, 2005, http://www.ewp.rpl.edu/hartford/~rhb/cs_seminar_2005/SessionA1/ambalakat.pdf.

Chenafa, M. et al., Biometric System Based on Voice Recognition Using Multiclassifiers, "Biometrics and Identity Management," Springer Berlin, pp. 206-215, May 5, 2008.

* cited by examiner

METHODS FOR IDENTIFYING THE GUARANTOR OF AN APPLICATION

CROSS-REFERENCE TO RELATED APPLICATIONS

This application is related to U.S. patent application Ser. No. 12/119,617 filed on May 13, 2008 and entitled "Multi-Channel Multi-Factor Authentication," now U.S. Pat. No. 8,006,291 issued on Aug. 23, 2011, U.S. patent application Ser. No. 12/137,129 filed on Jun. 11, 2008 and entitled "Single-Channel Multi-Factor Authentication," and U.S. patent application Ser. No. 12/608,190 filed on Oct. 29, 2009 and entitled "User Authentication for Social Networks," now U.S. Pat. No. 8,185,646 issued on May 22, 2012, each of which is incorporated herein by reference.

BACKGROUND OF THE INVENTION

1. Field of the Invention

The present invention relates generally to the field of third-party applications for platforms and more particularly to methods for providing/identifying a guarantor for such applications.

2. Related Art

Platform providers have introduced both closed and open systems with respect to third-party applications. A closed-platform, such as offered by Apple, only runs approved third-party applications. While this allows the platform provider to have control over content and enforce certain standards on third-party applications, it also is a burden to screen the candidates and negatively impacts the economics of building and distributing applications. Open platforms, such as offered by Google, leave the safety and security of devices largely in the hands of users. While some applications are approved, the platform provides a mechanism to bypass the approval process. Third-party applications that have not been approved can pose safety and security risks.

Platform providers can accept prospective applications electronically, approve the applications, and release them for distribution. In some instances platform providers, as part of the approval process, include an interview with a contact for the third party that remains anonymous. Persons writing and distributing harmful applications can do so repeatedly under assumed identities since there is no way to track who is posting applications.

SUMMARY

An exemplary method for providing an application for a platform comprises receiving an executable file, embedding an identifier of a signature of a guarantor into the executable file, and making the application available for use. For example, the application can be posted so that the executable file, including the identifier of the signature of the guarantor, can be downloaded to run on a user's computer or other device. As another example, the application can be made available for use on a website such that the executable file runs on one or more servers that serve the website. Executable files that are made available for downloading optionally can be signed. The method optionally further comprises generating the signature of the guarantor, and in some of these embodiments generating the signature of the guarantor can include storing records such as a video of the guarantor and/or a digital representation of a nucleic acid sequence derived from the guarantor. The signature may also include other biometric and non-biometric records that identify the guarantor. The method optionally also can comprise approving the executable file, and in some of these embodiments approving the executable file includes comparing a record of the signature of the guarantor against previously stored records of signatures. In various embodiments the platform comprises a mobile operating system such as iOS mobile operating system or a website like Facebook. Each of the steps of the method can be performed by a different computing system. In various embodiments, some or all steps are performed by the same computing system.

Another exemplary method of the present invention is directed to preventing a guarantor of a previous executable file from guaranteeing another executable file when the first executable file is found to include malicious software. According to the exemplary method, a first computing system embeds an identifier of a first signature of a first guarantor into a first executable file then the first application is posted. Then, the first application is determined to be a malicious application and the first signature is flagged. Next, a second signature of a second guarantor associated with a second executable file is generated. A record of the second signature is matched to a record of the first signature, indicating that the guarantor of the second executable file is the same person that guaranteed the malicious application. The second executable file is therefore disapproved.

Still another exemplary method of the present invention is directed to disapproving applications where a guarantor of the application has previously been a guarantor of another application under a different alias. The exemplary method comprises receiving an executable file, generating a signature of a guarantor of the executable file, and matching a record of the signature to a record of another signature stored in a database. If a match is found, and the two signatures suggest one person posing under different names, the platform provider can investigate further and disapprove of the received executable file if a reasonable explanation for the different names, such as a legal name change, cannot be determined.

DETAILED DESCRIPTION OF THE INVENTION

The present invention is directed to improving the security of third-party applications made available for use with platforms that run third party programs. A platform, as used herein, encompasses both operating systems such as the Android operating system for mobile devices, and certain websites, including e-commerce websites and social media websites, that allow for third-party applications. An application can comprise enhancements, utilities and/or new features for the platform. According to the present invention, a person known herein as a guarantor, can be linked to a third-part application. Linking applications to guarantors improves security in two ways. First, individuals intent on releasing malicious software through third-party applications are unlikely to be willing to provide biometric information, such as video recordings of themselves. Secondly, if an individual does become a guarantor to a third-party application that is later determined to be malicious, further attempts by the same individual to be a guarantor on subsequent third-party applications can be stopped.

Linking the guarantor to the executable file is achieved through the creation of a signature of the guarantor, a stored record of information about the person including biometric data. The signature is identified by a unique identifier which is embedded in the third-party application. Accordingly, guarantors can be identified and associated to the applications they guarantee, yet have no control over the production of the unique identifier and the stored authentication data. In addition to having a deterring effect and preventing repeat offenders, the present invention provides a class of applications for platforms that are inherently more trustworthy. Thus, platform installation programs can be configured, for example, to automatically install applications guaranteed according to the present invention while being configured to provide warnings when users attempting to install applications that are not guaranteed.

Figure 1:
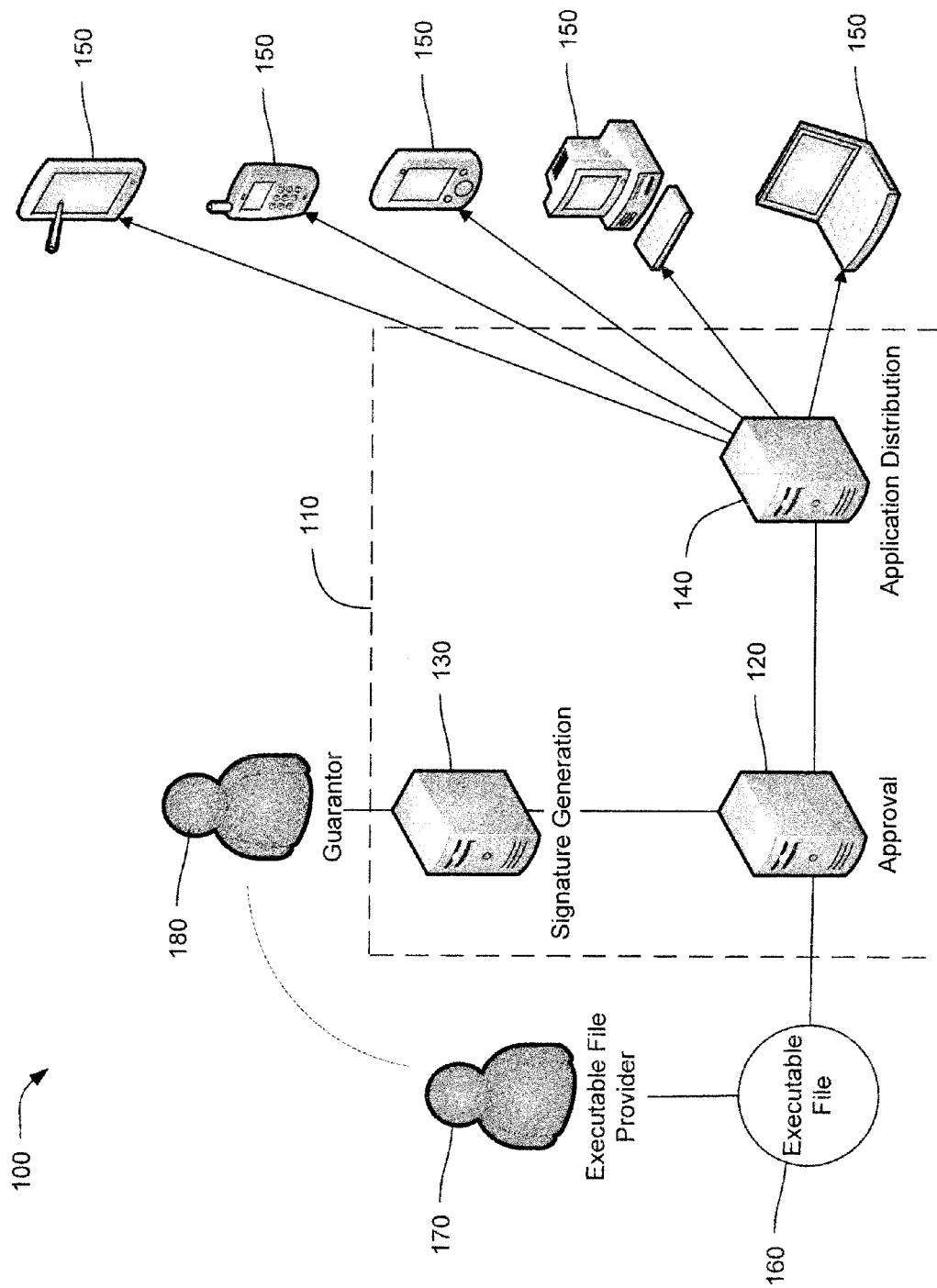
FIG. 1 is a schematic representation of an exemplary system for carrying out various methods described herein.

FIG. 1 shows an exemplary system 100 for carrying out various methods described herein. The system 100 comprises a platform provider system 110 including an approval computing system 120, a signature generation computing system 130, a computing system 140 that makes applications available to the public, and additional computing resources not necessary for the understanding of the present invention and therefore omitted for clarity. Although the platform provider system 110 is illustrated using three computing systems 120, 130, and 140 with different functions, it will be appreciated that the same functions can be performed by more or fewer computing systems. The platform provider system 110 also includes one or more databases (not shown) in communication with the computing systems 120, 130, and 140. The one or more databases comprise computer-readable memory devices that store organized collections of data. The computer-readable memory devices can comprise, for example, magnetic or optical storage media. Neither paper nor carrier waves constitute a computer-readable memory device, as the term is used herein.

The platform provider system 110 provides a platform such as an operating system or a website. In the case of an operating system, the platform provider system 110 provides to devices 150 that platform and applications that run on that platform. Exemplary operating systems include iOS, the mobile operating system developed by Apple Inc., and the Android mobile operating system initially developed by Android Inc., and later acquired by Google Inc. Devices 150 include smart phones, cell phones, personal digital assistants (PDAs), tablet devices, personal computers (PCs) laptops, servers and the like. In some instances the devices 150 receive the operating system and optionally some applications from the platform provider system 110 before being sold to consumers. Where the platform is a website, the platform provider system 110 makes the website available to devices 150.

The computing systems 120, 130, and 140 can comprise servers that are networked together, for example. The approval computing system 120 receives executable files 160 that are submitted by executable file providers 170 for distribution by the platform provider system 110 and optionally for approval by the platform provider system 110. The signature generation computing system 130 is configured to interact with a guarantor 180 to generate a guarantor signature to be linked to an executable file 160. The computing system 140 is configured to make available executable files 160 of applications. An executable file can be made available, for example, by posting the executable file for download, either for free or for a fee. In other embodiments, the executable file is made available by executing on the computing system 140 to provide content or a service to a user, for example, a game or virus scanning. The executable file provider 170 that provides an executable file 160 and the guarantor 180 who's signature is later linked to the executable file 160 can be the same or different. Where different, a relationship exists between the executable file provider 170 and the guarantor 180. For example, executable file provider 170 can be a corporation while the guarantor 180 is the Chief Technical Officer of the corporation.

Figure 2:
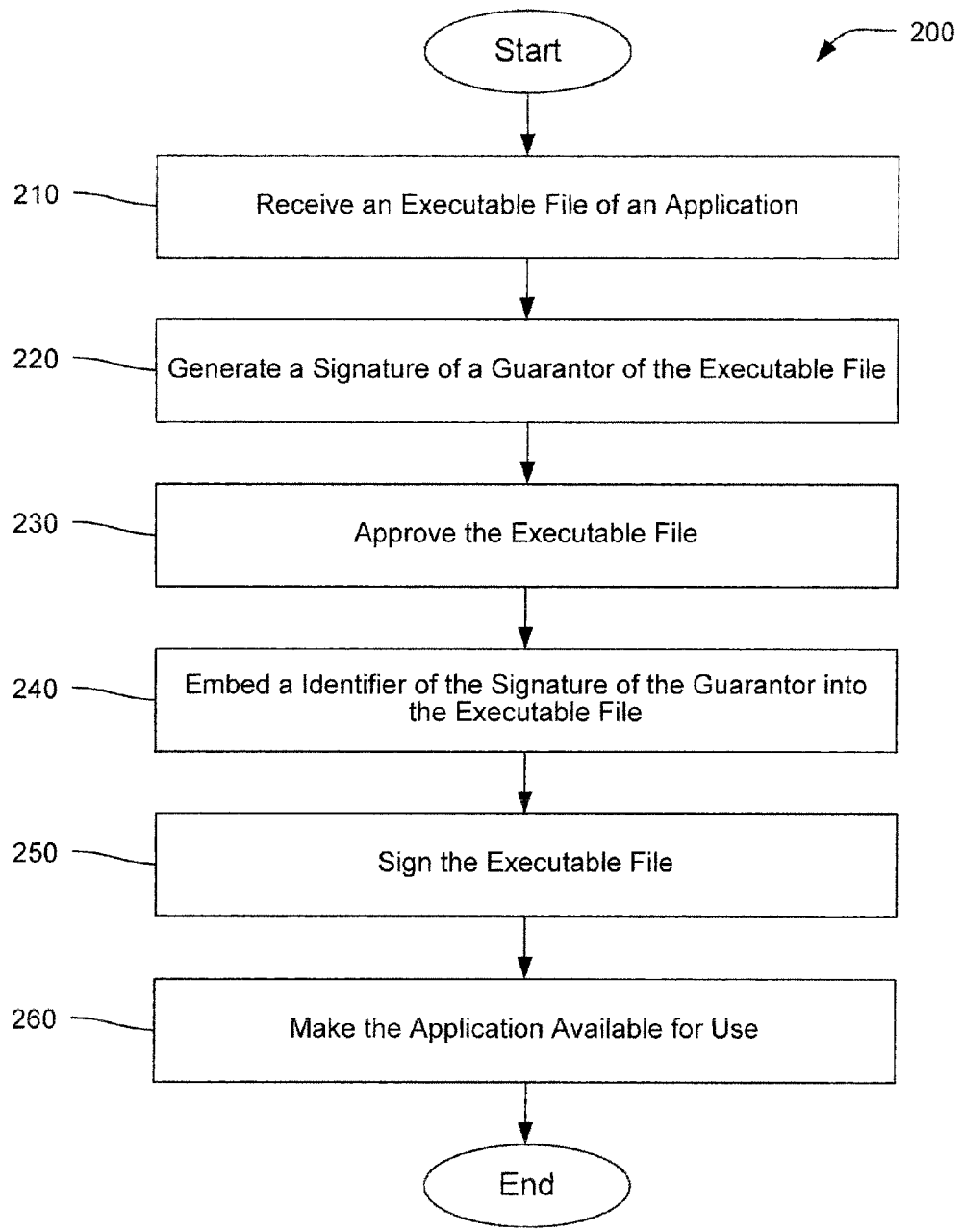
FIG. 2 is a flowchart representation of a method for providing an application for a platform according to an exemplary embodiment of the present invention.

FIG. 2 is a flowchart representation of an exemplary method 200 for providing an application for a platform. The method 200 comprises a step 210 of receiving an executable file 160. The executable file 160 is received by a first computing system which can be the platform provider system 110 or the approval computing system 120, for example. An executable file, as used herein, is a set of encoded instructions that can cause a computing system to perform tasks. Examples of encoded instructions include machine code instructions for a physical CPU, a file containing instructions, such as bytecode, for a software interpreter, and a scripting language source file. An example of an executable file is an application image, which as used herein refers to the combination of an application with just enough operating system (JeOS) and third-party components needed to run. The step 210 of receiving the executable file 160 can optionally further comprise receiving information associated with the executable file 160 such as the name of the application, a version number, the owner of the application, and the name of a guarantor 180. The executable file 160 can be received from the executable file provider 170 which can be, for example, the guarantor 180, an owner of the executable file 160, the creator of the executable file 160, or an agent to any of these parties.

The method 200 optionally comprises a step 220 of generating a signature of a guarantor 180 of the executable file 160. The step 220 is optional in that the signature can be generated by a third party, for example, and subsequently received by the platform provider system 110. The step 220 of generating the signature can be performed by the signature generation computing system 130, in some embodiments. The signature generation computing system 130 can communicate with the guarantor 180 over a network connection such as a LAN or the Internet, for example.

The step 220 of generating the signature comprises creating a set of records and storing the set of records in a database. The set of records comprises the signature of the guarantor 180. U.S. patent application Ser. No. 12/119,617 provides exemplary methods that can be implemented to create a set of records comprising, for example, biometric data such as a fingerprint record derived from fingerprints of the guarantor 180; a signature record derived from a signature of the guarantor 180, which may include information such as the rate and pressure of the writing implement in addition to simply an image of the signature itself; a facial recognition record derived from still or video images of the face of the guarantor 180; an iris scan record derived from an iris scan of the guarantor 180; and so forth. Records in the set can also comprise recordings of the voice and/or of the person such as audio recordings, video recordings, and photographs. In some embodiments, the signature of the guarantor 180 comprises a digital representation of a nucleic acid sequence derived from the guarantor 180. The nucleic acid sequence can be all or a part of the genome of the guarantor 180.

Records in the set can also comprise non-biometric records such as the name of the guarantor 180, as well as the person's driver's license, passport, and social security numbers, home and business addresses and phone numbers, and images of the person's birth certificate, and the like (e.g. artifacts). In various embodiments, the signature of the guarantor 180 comprises a video recording of the guarantor 180, and in some of these embodiments the signature also comprises other biometric records and/or non-biometric records.

As noted, the step 220 of generating the signature can be performed by the signature generation computing system 130 in communication with the guarantor 180. For example, the guarantor 180 can be facing a video camera attached to a PC in communication over a network with the signature generation computing system 130, the computing system 130 serves questions to be displayed by the PC and a video stream of the guarantor 180 providing responses is received and stored by the signature generation computing system 130. The video responses, and the questions put to the guarantor 180, become records that are stored in a database. Other records, such as name, birth date, social security number, and so forth, can be entered by the guarantor 180 through a webpage interface served by the signature generation computing system 130. Still other records can be uploaded to the signature generation computing system 130, such as images of certificates and licenses, or links to the records can be provided.

Alternatively, the step 220 of generating the signature can be performed at least in part through an in-person interview of the guarantor 180. The interview can include making video recordings, taking fingerprints, iris scans, collecting DNA samples, and the like. Although in these embodiments the step 220 includes an in-person interview, the signature generation computing system 130 receives the recordings and other information generated through the interview to create the signature of the guarantor 180. A DNA sample collected at the interview may be sent to a testing laboratory which determines a digital representation of a nucleic acid sequence derived from the DNA sample. The digital representation can be uploaded to the to the signature generation computing system 130 as a record of the signature. It should be appreciated that the signature be associated with information having evidentiary value.

The step 220 of generating the signature can also comprise generating an identifier that is uniquely associated with the signature of the guarantor 180. The identifier can be a numeric or alphanumeric string, for example. In some embodiments the identifier comprises a record locator or a transaction identifier (TID). A transaction identifier is differentiated from a record locator in that a record locator is associated with a signature that can be modified while a transaction identifier is associated with a signature that cannot be modified.

The method 200 further comprises another optional step 230 of approving the executable file 160. This step is optional in as much as some platform providers may opt to make applications available that are linked to a guarantor 180 without any review of the application. In other embodiments, however, the executable file 160 is reviewed in step 230, for example, to determine whether the executable file 160 includes malicious software or offensive material, to determine a rating, to check for bugs, and so forth. The step 230 can be performed by the approval computing system 120, in some embodiments.

In some embodiments, the step 230 additionally includes comparing the records of the signature of the guarantor 180 against the records of other signatures previously stored in the database. The comparison can screen for guarantors 180 of different executable files 160 that are actually the same person representing him/herself under different names. The comparison can also screen for guarantors 180 that have been previously associated with malicious software. In either case, the platform provider can disapprove of the executable file 160 under consideration, and in the first example the platform provider can optionally withdraw the earlier application from further distribution.

The method 200 further comprises a step 240 of embedding the identifier of the signature of the guarantor 180 into the executable file 160. Embedding the unique identifier into the executable file 160 comprises amending the executable file 160 to include the identifier in a known location so that the identifier can be read, if needed. Once the identifier has been embedded in the executable file 160, the executable file 160 can be given a specific file extension that indicates that the executable file 160 is linked to a guarantor 180. Another way to identify an executable file 160 as being linked to a guarantor 180 is to include a code in the first n characters of the file, where the code indicates a link to a guarantor 180. Similarly, a code in the first n characters of the file can indicate that a program descriptor follows; the operating system can recognize from the program descriptor that the executable file 160 is linked to a guarantor 180. Still another way to identify an executable file 160 as being linked to a guarantor 180 is to give the executable file a name that indicates a link to a guarantor 180. Still another way to identify an executable file 160 as being linked to a guarantor 180 is to store the executable file's name in association with the signature. Combinations of these can also be employed. Step 240 can be performed by the approval computing system 120, in some embodiments.

It should be noted that step 230 does not have to precede step 240, although shown that way in FIG. 2. In some embodiments step 230 of approving the executable file 160 occurs only if the step 240 of embedding the identifier of the signature is completed, for example. In other embodiments, the identifier is embedded in step 240 while the executable file is approved in step 230.

The method 200 further comprises an optional step 250 of signing the executable file 160 to insure that the executable file 160 is delivered unaltered. The executable file 160 can be signed, for example, by adding a private key to the executable file 160, where the private key has a corresponding public key and a certificate such as a developer certificate, a self-signed certificate or a key pair from a certificate distributor. The private key is optionally also encrypted. A signing server (not shown) of the platform provider system 110 generates the private key, the corresponding public key and stores both in association with the certificate. It will be appreciated that signing the executable file 160 in step 250 is not to be confused with generating a signature in step 220, the former pertaining to the integrity of the data file, the latter pertaining to a set of records, including biometric records, that identify a person.

The method 200 further comprises a step 260 of making the executable file available so that the application is available to the public to use on the platform. In some embodiments the application is made available by the computing system 140. As noted previously, the computing system 140 can make the application available by making the executable file available for download to any of the devices 150 or by running the executable file to provide content or services to a user of any of the devices 150. The step 260 of making the executable file available can also be performed by third-party computing systems (not shown) that distribute applications, as well as websites that allow enhanced searches for applications, rate applications, and allow comments and other reviews.

Figure 3:
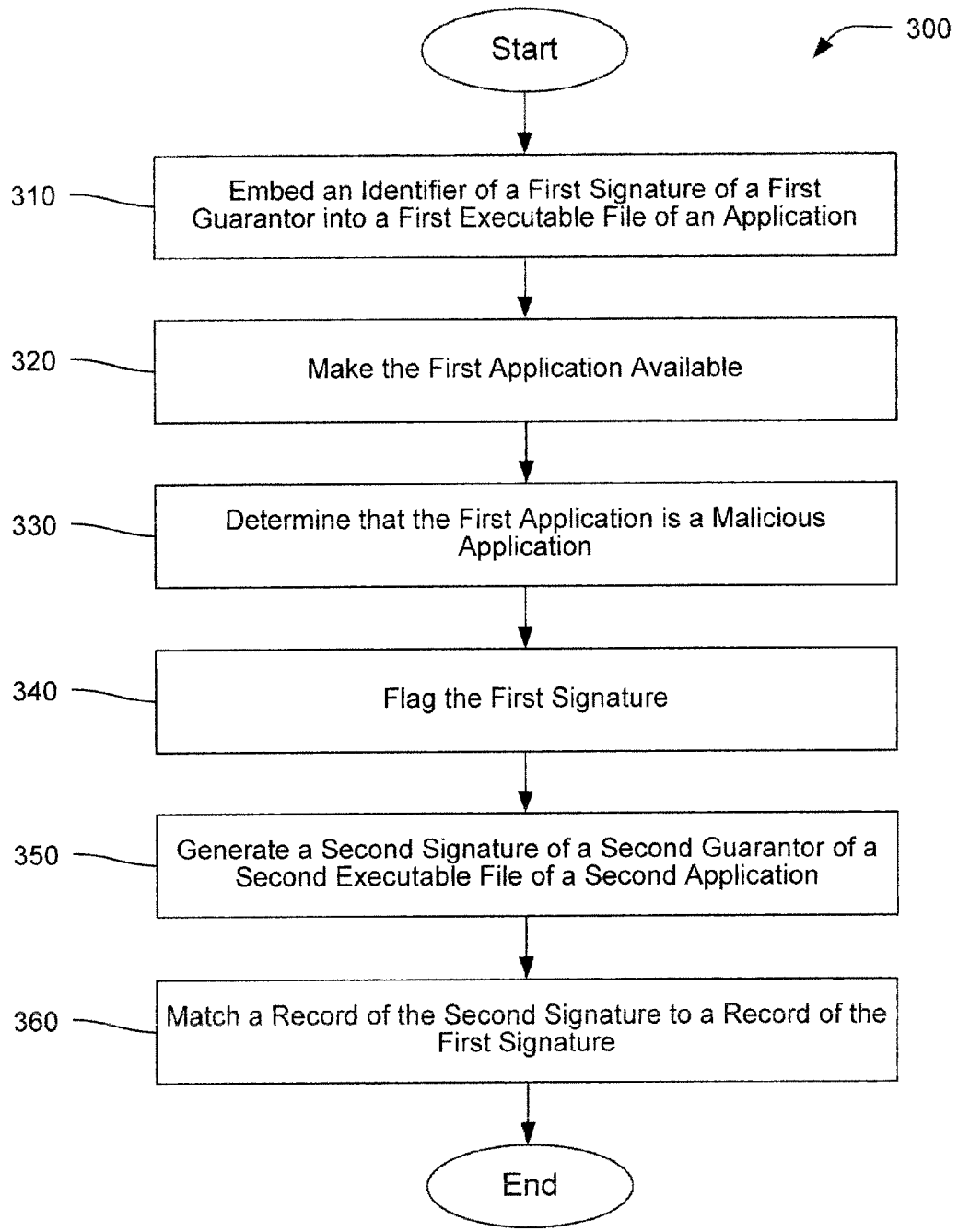
FIG. 3 is a flowchart representation of a method for preventing a guarantor of a malicious executable file from guaranteeing another executable file according to another exemplary embodiment of the present invention.

FIG. 3 is a flowchart representation of an exemplary method 300 for detecting a potentially malicious executable file 160 submitted by an executable file provider 170 for a platform. According to the method 300, a first executable file 160 is linked to a first guarantor 180 and made available to the public. Next, a determination is made that the first executable file is malicious, unreliable, inconsistent with the platform vendor's guidelines or otherwise harmful and a first signature of the first guarantor 180 is flagged as not trustworthy. Subsequently, a second signature of a second guarantor 180 of a second executable file 160 is generated. The records of the second signature are compared against signatures stored in a database. A match of a record of the second signature to a record of the first signature indicates that the second guarantor 180 is the first guarantor 180. Since the first guarantor 180 proved untrustworthy previously, the second executable file may be manually reviewed or it may be automatically determined that the second executable file 160 is not posted. Specific steps of method 300 are discussed below.

Method 300 includes a step 310 of embedding an identifier of a first signature of a first guarantor 180 into a first executable file 160, as described above with respect to step 240 of method 200. Method 300 optionally can include any of the other steps described in method 200 such as a step 320 of making the first application available as described above with respect to step 260. Method 300 next includes a step 330 of determining that the first application is a malicious application. Then, in a step 340 the first signature is flagged. The flag on the first signature marks the guarantor 180 as not trustworthy. It should be noted that step 320 is optional in that the step 330 of determining that the first application is a malicious application can occur during the step 230 of approving the executable file.

Method 300 further includes a step 350 of generating a second signature of a second guarantor associated with the second executable file, as described above with respect to step 220 of the method 200. The method 300 additionally includes a step 360 of matching a record of the second signature to a record of the first signature. Step 360 can be accomplished, for example, by searching a database of previously stored signatures of guarantors 180 until a match is found, such as the fingerprint record of the second signature matches the fingerprint record of the first signature. Once a match has been found between a record of the second signature and the flagged first signature, the second executable file can be disapproved.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method comprising:
    embedding, with a first computing system, an identifier of a first signature of a first guarantor into a first executable file, the signature of the first guarantor comprising at least one biometric record;
    posting the first executable file;
    determining that the first executable file is a malicious executable file;
    flagging the first signature;
    generating a second signature of a second guarantor associated with a second executable file; and
    matching a record of the second signature to a record of the first signature.

2. The method of claim 1 wherein the record of the second signature comprises a video of the second guarantor.

3. The method of claim 1 wherein the record of the second signature comprises a digital representation of a nucleic acid sequence derived from the second guarantor.

4. The method of claim 1 wherein the first executable file comprises an application image.

* * * * *